(12) United States Patent
Garmark et al.

(10) Patent No.: US 9,195,383 B2
(45) Date of Patent: Nov. 24, 2015

(54) SYSTEMS AND METHODS FOR MULTI-PATH CONTROL SIGNALS FOR MEDIA PRESENTATION DEVICES

(71) Applicant: Spotify AB, Stockholm (SE)

(72) Inventors: Sten Garmark, Stockholm (SE); Karl Magnus Röös, Uppsala (SE); Andreas Öman, Stockholm (SE); Per Gunnar Joachim Bengtsson, Kista (SE); Marcus Per Vesterlund, Stockholm (SE)

(73) Assignee: SPOTIFY AB, Stockholm (SE)

( * ) Notice: Subject to any disclaimer, the term of this patent is extended or adjusted under 35 U.S.C. 154(b) by 266 days.

(21) Appl. No.: 13/784,704

(22) Filed: Mar. 4, 2013

(65) Prior Publication Data

US 2014/0006483 A1 Jan. 2, 2014

Related U.S. Application Data

(60) Provisional application No. 61/666,732, filed on Jun. 29, 2012, provisional application No. 61/727,649, filed on Nov. 16, 2012.

(51) Int. Cl.
*H04L 29/06* (2006.01)
*G06F 3/0484* (2013.01)
*H04L 29/08* (2006.01)

(52) U.S. Cl.
CPC ........ *G06F 3/04847* (2013.01); *G06F 3/04842* (2013.01); *H04L 65/1083* (2013.01);
(Continued)

(58) Field of Classification Search
CPC ............ H04L 65/1083; H04L 65/4069; H04L 65/1093; H04L 65/4092; H04L 67/104; H04L 67/42; G06F 3/04842
USPC .......................................................... 709/203
See application file for complete search history.

(56) References Cited

U.S. PATENT DOCUMENTS

2004/0068756 A1* 4/2004 Chiu ............................. 725/135
2004/0133908 A1 7/2004 Smith et al.
(Continued)

FOREIGN PATENT DOCUMENTS

DE 102005033211 1/2007
EP 1845684 10/2007
(Continued)

OTHER PUBLICATIONS

Spotify AB, International Search Report and Written Opinion, PCT/IB2013/001945, Dec. 18, 2013, 22 pgs.
(Continued)

*Primary Examiner* — Larry Donaghue
(74) *Attorney, Agent, or Firm* — Morgan, Lewis & Bockius LLP

(57) ABSTRACT

A method for controlling media presentation is disclosed. In some implementations, the method is performed at a first electronic device having one or more processors and memory storing one or more programs for execution by the one or more processors. The first electronic device receives a media control command for a second electronic device. In response to receiving the media control command, the first electronic device sends a server media control request to a server system, and sends a local media control request to a second electronic device within a local network to which both the first electronic device and the second electronic device are connected. In some implementations, the server system is associated with an IP address outside an IP address space of the local network. In some implementations, the first electronic device and the second electronic device are associated with IP addresses within the same subnetwork.

21 Claims, 9 Drawing Sheets

(52) U.S. Cl.
CPC ........ *H04L65/1093* (2013.01); *H04L 65/4069* (2013.01); *H04L 65/4092* (2013.01); *H04L 67/42* (2013.01); *H04L 67/104* (2013.01)

(56) References Cited

U.S. PATENT DOCUMENTS

| | | | |
|---|---|---|---|
| 2005/0251566 A1 | 11/2005 | Weel | |
| 2005/0251576 A1* | 11/2005 | Weel | 709/227 |
| 2005/0289236 A1 | 12/2005 | Hull et al. | |
| 2009/0063703 A1 | 3/2009 | Finkelstein et al. | |
| 2009/0199254 A1* | 8/2009 | White | H04N 7/163 725/110 |
| 2010/0037274 A1 | 2/2010 | Meuninck et al. | |
| 2010/0067378 A1* | 3/2010 | Cohen et al. | 370/231 |
| 2010/0121891 A1 | 5/2010 | Zampiello | |
| 2010/0262675 A1 | 10/2010 | Meuninck et al. | |
| 2011/0110275 A1 | 5/2011 | Shaheen | |
| 2011/0131332 A1 | 6/2011 | Bouazizi | |
| 2011/0131520 A1* | 6/2011 | Al-Shaykh et al. | 715/772 |
| 2011/0196973 A1 | 8/2011 | Shaheen et al. | |
| 2011/0219105 A1 | 9/2011 | Kryze et al. | |
| 2012/0084356 A1 | 4/2012 | Ferdi | |
| 2012/0117632 A1 | 5/2012 | Curtis et al. | |
| 2012/0198350 A1* | 8/2012 | Nhiayi | 715/740 |
| 2013/0034197 A1* | 2/2013 | Aweya et al. | 375/362 |
| 2014/0006947 A1* | 1/2014 | Garmark | G06F 3/0484 715/716 |
| 2014/0214927 A1* | 7/2014 | Garmark | H04L 65/60 709/203 |
| 2014/0215334 A1* | 7/2014 | Garmark | H04L 65/60 715/716 |
| 2015/0026746 A1* | 1/2015 | Fondberg | H04L 65/4084 725/112 |
| 2015/0199122 A1* | 7/2015 | Garmark | H04L 67/42 715/716 |

FOREIGN PATENT DOCUMENTS

| | | |
|---|---|---|
| EP | 2160029 | 3/2010 |
| WO | WO 2007/101182 | 9/2007 |

OTHER PUBLICATIONS

Spotify AB, Invitation to Pay Additional Fees, PCT/IB2013/001929, Dec. 18, 2013, 8 pgs.
Spotify AB, International Preliminary Report on Patentablity, PCT/IB2013/001929, Dec. 31, 2014, 44 pgs.
Spotify AB, International Preliminary Report on Patentability, PCT/IB2013/001945, Dec. 31, 2014, 19 pgs.
Anonymous, Last.fm, en.wikipedia.org/w/index.php?title=Last.fm &oldid=499039710, Jun. 23, 2012, pp. 4, 9.
Katz, Playlist-Based Radio, Post to Tumblr and embeddable Play Buttons Come to Spotify for Windows and Mac OS, Spotify blog, May 11, 2012, 1 pg.
O'Neill, The Complete Guide to YouTube Playlists, Oct. 21, 2010, 1 pg.
Spotify AB, International Search Report and Written Opinion, PCT/IB2013/001929, Feb. 26, 2014, 53 pgs.
Spotify AB, International Search Report and Written Opinion, PCT/IB2013/001938, Dec. 19, 2013, 23 pgs.
Communication Pursuant to Rule 161(2) and 162 EPC, EP 13766665.7, Feb. 17, 2015, 2 pgs.

* cited by examiner

SYSTEMS AND METHODS FOR MULTI-PATH CONTROL SIGNALS FOR MEDIA PRESENTATION DEVICES

RELATED APPLICATIONS

This application claims priority to U.S. Provisional Application Nos. 61/666,732, filed Jun. 29, 2012 and 61/727,649, filed Nov. 16, 2012 entitled "Systems and Methods for Multi-Context Media Control and Playback," which are hereby incorporated by reference in their entireties.

TECHNICAL FIELD

The disclosed implementations relate generally to controlling and playing back media content.

BACKGROUND

Modern users have a variety of options for devices and ways to consume media content. For example, multiple different types of media, including text, still images, video, audio, and other digital media, can be consumed on personal computers, laptops, mp3 players, mobile phones, tablet computers, televisions, stereos, and many other electronic devices. These electronic devices typically have the ability to store digital media files in memory that is integrated into the devices. But acquiring and storing all the media content to which a user desires access can be prohibitively difficult and expensive.

Current technology also allows users to stream digital media content to their electronic devices over local networks or the Internet, for example, including over wireless connections. Streaming services allow users to have access to a much larger collection of media than would otherwise be possible. Streaming services store media content on servers remote from the electronic devices, and then send the media content to the electronic devices when it is requested. The media content is then cached on the electronic device for presentation. In some cases, the content may be temporarily buffered/stored before presentation, but typically the data is deleted from memory after presentation, allowing an almost unlimited amount of media to be streamed to a device without running out of storage space on the electronic device. Some streaming services also allow streamed content to be stored on the local device.

As more and more devices are capable of streaming media content from remote servers, as well as storing media content locally, it is often cumbersome to manage all of the different sources of media to which a user has access. Moreover, even where a user has multiple devices that can access the same content (for example, a handheld device and a laptop computer that can both access a media streaming service), each device must typically be controlled with its own dedicated interface. Accordingly, it would be advantageous to provide systems and methods that allow a user to remotely control various electronic devices in a simple and intuitive manner.

SUMMARY

In accordance with some implementations, a method of controlling media presentation is disclosed. In some implementations, the method is performed at a first electronic device having one or more processors and memory storing one or more programs for execution by the one or more processors. The first electronic device receives a media control command for a second electronic device. In response to receiving the media control command, the server sends a server media control request to a server system, and sends a local media control request to a second electronic device within a local network to which both the first electronic device and the second electronic device are connected. Local networks may be Local Area Networks (LANs), Personal Area Networks (PANs), ad-hoc computer networks, peer-to-peer computer networks, and the like, and may be wired or wireless. Local networks may use one or more communication standards, protocols, or technologies, such as Internet Protocol (e.g., including Transmission Control Protocol, User Datagram Protocol, Internet Control Message Protocol, Hypertext Transfer Protocol, etc.), BLUETOOTH, Wired Ethernet (e.g., IEEE 802.3), Wireless Fidelity (Wi-Fi) (e.g., IEEE 802.11a, IEEE 802.11b, IEEE 802.11g, and/or IEEE 802.11n), or any other suitable communication protocol, including communication protocols not yet developed as of the filing date of this document. For example, in some implementations, two nearby devices in communication with one another via BLUETOOTH communication technologies constitutes a local network.

In some implementations, the server media control request is sent to the server system over the Internet. In some implementations, the first electronic device provides a single user interface that allows a user both to select media content for presentation by the first electronic device and to generate media control requests configured to cause the media content to be presented by the second electronic device.

Media content is selected from the group consisting of: an audio track, a video, an image, an audio playlist, and a video playlist. In some implementations, the first electronic device is selected from the group consisting of: a remote control device, a computer, a television, a mobile phone, a portable media player, a tablet computer, a home media receiver/player, and a home audio/visual system. In some implementations, the second electronic device is selected from the group consisting of: a computer, a television, a mobile phone, a portable media player, a tablet computer, a home media receiver/player, a home audio/visual system, and a speaker. In some implementations, the server and the local media control requests are both configured to cause a single media control operation to be implemented at the second electronic device. In some implementations, the media control operation is selected from the group consisting of: play, pause, skip, fast-forward, rewind, adjust an audio volume, change an order of items in a playlist, add items to a playlist, remove items from a playlist, adjust audio equalizer settings, and set a user setting.

In accordance with some implementations, another method of controlling media presentation is disclosed. In some implementations, the method is performed at a second electronic device having one or more processors and memory storing one or more programs for execution by the one or more processors. The second electronic device receives, from a server system, a server media control request corresponding to a media control operation to be implemented at the second electronic device, wherein the server media control request was sent from the server in response to the server receiving the server media control request from a first electronic device. The second electronic device receives, from the first electronic device, a local media control request sent within a local network to which both the first electronic device and the second electronic device are connected, wherein the local media control request corresponds to the media control operation.

In some implementations, the server media control request is received prior to the local media control request. In response to receiving the server media control request, the second electronic device performs the media control operation. After receiving the local media control request, the second electronic devices determines whether the server media control request and the local media control request correspond to the same media control operation. If the server media control request and the local media control request correspond to the same media control operation, the server ignores the local media control request.

In some implementations, the media control operation is a request to begin presenting media content at the second electronic device, and the media content is being presented by the first electronic device. Prior to receiving the server media control request or the local media control request, the second electronic device buffers/caches an upcoming portion of the media content being presented by the first electronic device. The second electronic device receives one of the server media control request or the local media control request. The second electronic device initiates presentation of the buffered portion of the media content.

In accordance with some implementations, another method of controlling media presentation is disclosed. In some implementations, the method is performed at a second electronic device having one or more processors and memory storing one or more programs for execution by the one or more processors. The second electronic device receives, from a first electronic device, a local media control request corresponding to a media control operation, wherein the local media control request is sent within a local network to which both the first electronic device and the second electronic device are connected. The second electronic device receives a media stream from a server system, wherein the media stream was sent from the server in response to the server receiving a server media control request from the first electronic device, and wherein the server media control request corresponds to the media control operation.

In some implementations, the media stream is received prior to receiving the local media control request. In response to a determination that the local media control request corresponds to a request to initiate presentation of the media stream, the second electronic devices ignores the local media control request.

In accordance with some implementations, another method of controlling media presentation is disclosed. In some implementations, the method is performed at a server system having one or more processors and memory storing one or more programs for execution by the one or more processors. The server system receives, from a first electronic device, a server media control request, wherein the first electronic device also sends a local media control request to the second electronic device within a local network to which both the first electronic device and the second electronic device are connected, and wherein the server media control request and the local media control request are both configured to initiate a same media control operation by the second electronic device. The server system sends at least one of the server media control request or a media stream corresponding to the server media control request to the second electronic device.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device is provided that comprises means for performing any of the methods described herein.

In accordance with some implementations, an electronic device is provided that comprises a processing unit configured to perform any of the methods described herein.

In accordance with some implementations, an electronic device is provided that comprises one or more processors and memory storing one or more programs for execution by the one or more processors, the one or more programs including instructions for performing any of the methods described herein.

In accordance with some implementations, an information processing apparatus for use in an electronic device is provided, the information processing apparatus comprising means for performing any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
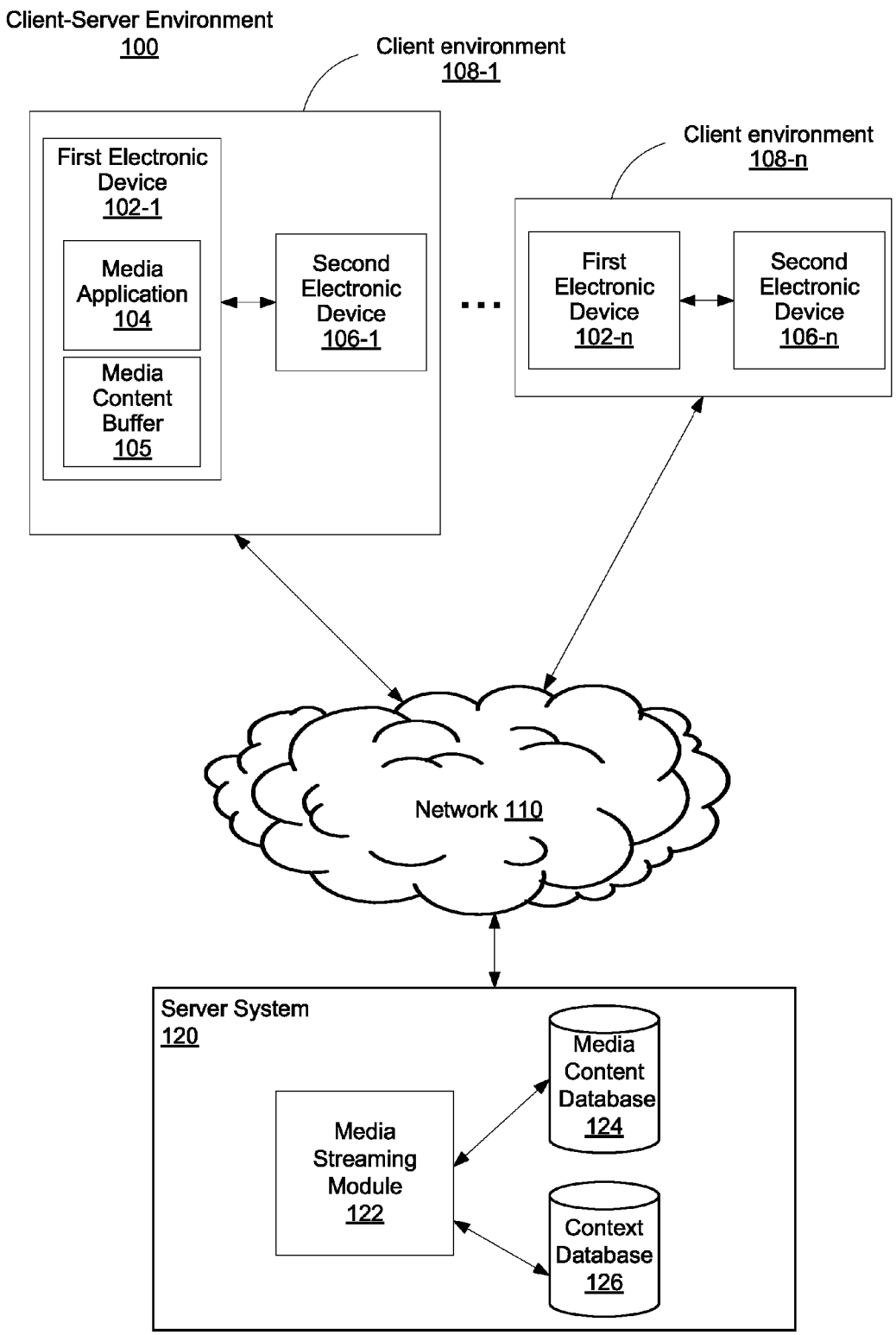
FIG. 1 is a block diagram illustrating a server client environment in accordance with some implementations.

The various implementations described herein enable a first electronic device to remotely control media presentation at a second electronic device. In some implementations, the disclosed systems and methods enable a user with a first electronic device to use the first electronic device to playback media content, and also to use the first electronic device to cause media content to be presented by a second electronic device. For example, a user may use a mobile phone to listen to music. The user may also use the same mobile phone as a remote control to control the playback (and/or other functionalities) of a second device, such as a laptop computer, a desktop computer, a home media receiver/player, or a home audio/visual system. Thus, the first device, which is separate and distinct from the second device, can both present media and control other media devices.

In order to cause media control operations to be performed at a second electronic device, the first electronic device sends media control requests to the second electronic device. Media control requests are communications configured to cause some media control operation, such as initiating or controlling media content playback (e.g., play, stop, pause, change volume, skip, etc.). Increasingly, homes, businesses, and other locations provide local communications networks, such as a wireless or wired Ethernet network, a BLUETOOTH network, or the like, to which multiple devices are connected. Accordingly, a person's mobile phone, home media system, computer, television, etc., may all be connected to the same local communications network, allowing these devices to communicate with each other and with other devices outside the local communications network (e.g., on the Internet) to send and receive the media control requests.

In some implementations, the first device sends media control requests to the second device through multiple channels, such as through a central server as well as via a local network. This may increase the speed and reliability of the media control requests, thus creating a more responsive and robust remote-control system for the user. Additionally, sending the media control requests via the different paths (e.g., through a local network as well as through the wider Internet) ensures that the remote control functionality operates properly under many different network connectivity situations. For example, if a user's local wireless network (e.g., a wireless LAN, PAN, etc.) is not configured to allow a handheld device to communicate directly to another media playing device, media control requests are still sent from the handheld device, through the Internet (e.g., through a cellular data network), to the other media playing device. If, on the other hand, the handheld device does not have access to the Internet, but the user's local wireless network is configured to allow direct communication between devices, the media control requests are still sent to the other media playing device despite the lack of Internet access. Accordingly, in some implementations described herein, media control requests are sent from a first electronic device to a server system located remotely from the first electronic device. The server system then causes a second electronic device to present media in accordance with the request from the first electronic device.

As noted above, in some implementations, the first and second electronic devices are located on the same local network. In some implementations, the local network is a Local Area Network (LAN). In some implementations, a LAN is a type of local network that creates IP address space behind a traffic routing device (e.g., a wired or wireless router) and limits incoming connections based on the specific requirements for the Local Area Network. In some implementations, LANs facilitate connections between devices on the LAN without using a public domain name system. In some implementations, devices on a LAN communicate using TCP/IP protocols. In some cases, Local Area Networks are confined to a single building or a group of buildings in relatively small geographical proximity. In some implementations, the local network is a Personal Area Network (PAN). In some implementations, a PAN is a network of devices that spans a relatively small geographical distance, such as a few inches or yards. In some implementations, a PAN is established using a peer-to-peer and/or an ad-hoc network. In some implementations, devices in a peer-to-peer and/or ad-hoc network communicate using BLUETOOTH communications technology, wireless universal serial bus, infrared communication protocols, etc. Local networks may be wired or wireless.

In some implementations, the server system is located remotely from both the first and the second electronic device. For example, in some implementations, the server system is not located on the same local network (e.g., it is not in the same LAN, PAN, peer-to-peer network, ad-hoc network, etc.) as either the first electronic device or the second electronic device. Thus, the first and second electronic devices can communicate over a local network, as described above, while, in contrast, communication between the server system and the first and second electronic device is over a network such as the Internet.

Another feature of the disclosed ideas is that the same application, and even the same graphical user interface (GUI), can be used for both presenting media content by the first electronic device and for controlling the presentation of media by the second electronic device. This provides a seamless experience for the user, as the user does not need to use different control interfaces (e.g., buttons, touchscreens, remote controls, etc.) for each device, thus obviating the need for the user to learn and use different control interfaces, keyboard layouts, media control functionalities, and the like, for different devices.

Furthermore, in some implementations, a media control request is configured to change the active presentation device for media content that is currently being presented. For example, a user who is listening to a music playlist on a mobile phone can request to change the active listening device to a home stereo system. In some implementations, the request to change media presentation devices is initiated by a user (e.g., via a user interface on the mobile phone). In some implementations, the request is initiated automatically and without user intervention by automatically detecting a predetermined condition, such as location, date, time of day, and/or day of week. For example, if a user is listening to an audio playlist on a mobile phone while walking home, the user's home stereo system may begin playing back the audio instead of (or in addition to) the mobile phone once it is determined that she has arrived at her home (e.g., using a positioning system (e.g., a GPS, cell-tower triangulation, etc.), proximity sensors, inertial monitoring devices, etc.).

In some implementations, the switching occurs in response to the server system receiving notification from the first electronic device that a specific predetermined condition has been met. For example, the first electronic device may monitor its geographic location, and when it determines that it has moved into (or out of) a predefined area, the first electronic device will send a notification to the server system that the predetermined condition has been met. In another example, the condition is met when the server detects a change in the state of the first electronic device, such as when the first electronic device establishes communication with a particular wireless network, or when the first electronic device pairs with or detects the second electronic device. In response, the server system ceases transmitting the media content stream to the first electronic device and begins transmitting the media content stream to a second electronic device. In this way, the user is able to establish conditions for automatically changing the device to which media content is being streamed or stream between devices.

Automatic switching may also be conditioned on additional factors, such as whether a device on which presentation is to be initiated is already presenting other media content, a time of day, a time of week, etc. For example, continuing the previous example, if the home stereo system is already presenting media content when the user returns home, the home stereo system will not switch to the playlist that was being presented on the user's mobile phone. This, in this case, the home stereo is available to be automatically activated only when it is idle and/or not presenting other media content.

In some implementations, the active presentation device is configured to automatically change only during predetermined time or date ranges. For example, in some implementations, a home stereo system will automatically begin presenting media content only during daytime hours (e.g., between 10:00 AM and 8:00 PM), and/or during weekends. Such rules may In some implementations, different users have different priority levels for automatic device switching. This can help avoid frequent and annoying changes in media presentation due to different users returning home, entering a particular area, etc. In some implementations, when a user initiates presentation of media content at a device, the user's priority level is logged or stored. When another user attempts to initiate presentation of different media content at that device, the other user may do so only if his or her priority level is above the first user. In some implementations, priority levels are only used to determine whether automatic device switching may occur. Thus, if a lower-priority user returns home while listening to a certain playlist, but a higher-priority user is already listening to music (or presenting other media content) via the home stereo, the lower-priority user's playlist will not be automatically presented via the home stereo system. On the other hand, manual requests to change the media content being presented by the home stereo system may be implemented regardless of the priority level of the requestor.

In some implementations, media presentation devices can present media content regardless of the origin of the content. For example, content in the audio playlist in the preceding example may be stored on the mobile phone, and streamed to the home stereo system from the mobile phone (e.g., via a local connection, such as a wireless LAN, peer-to-peer connection, a public network such as the Internet, etc.). If the content in the audio playlist is being streamed from a separate source (e.g., a remote server associated with a media content provider, a local media server, etc.), then the source can simply switch the destination of the audio stream from the mobile phone to the home stereo system.

In some implementations, when the active presentation device is changed, media content is delivered to the active presentation device regardless of the origin of the content. For example, when a song in an active playlist is stored on the user's mobile phone (but presented by the user's home stereo system), the song will be streamed or otherwise provided by the mobile phone; when a song is stored on a user's network accessible storage (NAS) system, the song will be streamed or otherwise provided by the NAS; when a song in the playlist is stored in a remote server, that song will be streamed or otherwise provided by the remote server. Songs that are stored in different locations (e.g., on the mobile phone and the remote server) can be included in the same playlist, and can be streamed to whatever device is playing the playlist.

In some implementations, when the active presentation device is changed, the context of the content stream, originally available on the first presentation device, becomes available on the second presentation device. The context of a content stream includes various information about the content stream, including the position within the currently playing media content, the previously presented media content (e.g., a play history), the position within previously presented media content (if unfinished), the media content to be played next, metadata of the current or upcoming media content (e.g., artist, album, track), etc. For example, the media content, once playback is initiated at the second electronic device, will retain the position in the current media content item and the position of the active playlist. In this way the media stream being presented on the first device is seamlessly transferred to a new device while maintaining the same state as on the first device. Thus, users may easily switch between devices without fear of losing their place in a song, a movie, a playlist, etc.

In some implementations, when media content is being presented at one device, one or more other devices buffer/cache a portion of that media content, for example, in case the user should choose to present the media content with one of the other devices instead of or in addition to the current device. In this way, the other devices are able to begin presenting the media content quickly, as the media presentation can begin at the other device(s) as soon as they receive a request to do so, rather than waiting for communications to be established between a media content source and the presentation device, for initial buffering of streaming content prior to presentation, and the like.

Attention is now directed to the figures, and in particular to FIG. 1, which is a block diagram of a client-server environment, according to some implementations. The client-server environment 100 includes one or more client environments (108-1 ... 108-n) and a server system 120 that are connected through a network 110. In some implementations, the client environments 108-n include one or more electronic devices (e.g., first electronic devices 102-n and second electronic devices 106-n). In some implementations, the server system 120 is associated with a media content provider to which users (and their electronic devices) may have accounts that enable the user to access media content from the server system 120. The network 110 includes any of a variety of networks, including wide area networks (WAN), wireless networks, wired networks, the Internet, or a combination of such networks.

In accordance with some implementations, the client environment 108-1 includes a first electronic device 102-1. In some implementations, the first electronic device 102-1 is one of the group of: a personal computer, a mobile electronic device, a laptop, a tablet computer, a mobile phone, a digital media player, or any other electronic device able to present media content.

In accordance with some implementations, the client environment 108-1 also includes a second electronic device 106-1. In some implementations, the second electronic device 106-1 is one of the group of: a computer, a home audio/visual system, a home media receiver/player, or any other electronic device able to present media content. In some implementations, both the first electronic device 102-1 and the second electronic device 106-1 are associated with a common user account (or associated user accounts) provided by a content provider with which the server system 120 is associated. For example, in some implementations, the server system 120 is operated and/or provided by a subscription-based media streaming service to which a user may have an account, and the first and second electronic devices 102-1, 106-1 are each associated with account credentials that enable them to communicate with and receive content from the server system 120.

In accordance with some implementations, both the first electronic device 102-1 and the second electronic device 106-1 are on the same local network. In some implementations, the first electronic device 102-1 and the second electronic device 106-1 are on different local area networks. In some implementations, the local network is a Local Area Network. In some implementations, the server system 120 is not located on the same Local Area Network as either the first electronic device 102-1 or the second electronic device 106-1.

As noted above, Local Area Networks are often associated with a relatively small geographic area (e.g., one house or building) and create IP address space behind a traffic routing device. In some implementations, the traffic routing device uses network address translation to connect devices within the LAN to devices outside the LAN. Network address translation is the process of readdressing packets by modifying the IP address contained in each packet so that the packets reach their intended destination device. Network address translation allows a plurality of electronic devices on the Local Area Network to connect to the Internet through a single IP address (e.g., the IP address of the traffic routing device). The traffic routing device (i.e. a router) receives incoming packets, determines which device on the Local Area Network is the intended recipient, and modifies the IP address to correctly identify that device. For example, a Local Area Network has 5 devices with local IP addresses 192.168.0.1-192.168.0.5 that all connect to a router. The router connects to the Internet and has an IP address of 12.162.29.2. Using network address translation, the router translates the source address for all communications sent from any of the 5 devices and intended for destinations in the Internet to be 12.162.29.2 (the router's IP address). On the other hand, the router collects all packets incoming from the Internet, determines the intended recipient device based upon the contents of each packet, and translates the destination IP address to the address of the correct device on the Local Area Network. So when the intended device is the device with Local Area Network IP address 196.168.0.2, the router would change the destination address to this address. Local Area Networks also commonly use firewalls to limit incoming connections. In this way, computer devices outside of the Local Area Network are generally not able to communicate directly with the devices on a Local Area Network. Indeed, in some Local Area Networks the devices in the network are not contactable even by other devices in the Local Area Network.

In some implementations, both the first electronic device 102-1 and the second electronic device 106-1 are on the same Personal Area Network. In some implementations, the Personal Area Network uses BLUETOOTH communication technology. In some implementations, the server system 120 is not located on the same Personal Area Network as either the first electronic device 102-1 or the second electronic device 106-1.

In some implementations, the first electronic device 102-1 includes a media content presentation and control application 104 (hereinafter "media application"). The media application 104 is able to control the presentation of media by the electronic device 102-1. For example, the media application 104 enables a user to navigate media content items, select media content items for playback on the electronic device 102-1, create and edit playlists, etc. In some implementations, media content is stored by the first electronic device 102-1 itself. In other implementations, the media content is stored by a server system 120, which may be located remotely from the first electronic device 102-1. The media content is then streamed from the server system 120 to the first electronic device 102-1 over the network 110.

In some implementations, the data streamed from the server system 120 is temporarily stored/cached by the first electronic device 102-1 in the media content buffer 105 in the memory of the first electronic device 102-1. In some implementations, media content stored in the media content buffer 105 is removed after the media content is presented by the first electronic device 102-1, allowing new media content data to be stored in the buffer 110. In other implementations, at least some of the media content stored in the media content buffer 105 is retained for a predetermined amount of time after the content is presented by the first electronic device 102-1 and/or until other predetermined conditions are satisfied.

In some implementations, the media application 104 is also able to control media content presentation by the second electronic device 106-1, which is distinct from the first electronic device 102-1. Thus, the user is able to use the media application 104 to cause the electronic device 102-1 to act both as a media presentation device as well as a remote control for other media presentation devices. This allows a user to control media presentation on multiple electronic devices from within a single application 104, and/or using a single user interface.

In some implementations, when a user wants to use the first electronic device 102-1 to control media presentation by the second electronic device 106-1, the user interacts with the media application 104 to send a media control request (e.g., server media control request 112, FIG. 2) to the server system 120. The server system 120 receives the media control request over the network 110. For example, the user may press a button on a touchscreen of the first electronic device 102-1 in order to send the media control request to the server system 120 and/or directly to the second electronic device 106-1. As described below, a media control request is, for example, a request to begin presentation of media content by the second electronic device 106-1. Though often used herein to describe requests to initiate or begin presentation of media by the second electronic device 106-1, in some implementations, media control requests also include requests and/or signals to control other aspects of the media that is being presented on the second electronic device 106-1, including but not limited to commands to pause, skip, fast-forward, rewind, adjust volume, change the order of items in a playlist, add or remove items from a playlist, adjust audio equalizer settings, change or set user settings or preferences, provide information about the currently presented content, and the like.

The client-server environment 100 also includes a server system 120. In some implementations, the server system 120 includes a media streaming module 122, a media content database 124, and a context database 126. The media content database 124 stores media content that can be presented by an electronic device. For example, in some implementations, the media content database 124 stores audio (e.g., music, audio-books, etc.), video (e.g., movies, television shows, etc.), images, or other content that can be streamed to other electronic devices. In some implementations, the media content database includes data stored in different formats and file types to allow a variety of different devices and/or applications to receive streamed content. In some implementations, the data is stored in a single file format and is converted/transcribed to the appropriate data type before or as it is streamed to a remote device.

In some implementations, the server system 120 includes a media streaming module 122. In some implementations, the media streaming module 122 receives media control requests from electronic devices and streams media content in response. In some implementations, the media streaming module 122 receives media control requests from a first electronic device 102-1 and forwards the request to a second electronic device 106-1, which then makes the final request to the server system 120 for the media content. For example, a user sends a media control request to the server using a mobile phone (a first electronic device) requesting that media be presented by a home stereo system (a second electronic device). The server system 120 then sends the requested media (and/or the media control request) to the home stereo system. This and other techniques are discussed in greater detail below with respect to FIGS. 5-8.

In some implementations, the received media control request includes information identifying the electronic device to which the server system 120 should forward the media control request. For example, a user may have multiple electronic devices that can present media from the server system 120, such as a mobile phone, a computer system, a television, a home stereo, etc. In some implementations, the identifying information is a unique or semi-unique device identifier, such as an IP address, a Media Access Control address (MAC address), a user-specified device name, an International Mobile Equipment Identity number (IMEI number), or the like. Accordingly, the media control request will identify that a request is intended for the home stereo, for example, so that the server system 120 can send the requested media and/or the media control request to the home stereo.

In some implementations, the server system 120 includes a context database 126. The context database 126 stores data associated with the presentation of media content by an electronic device. In some implementations, the context database 126 includes, among other things, the current position in a media content stream that is being actively presented by an electronic device, a playlist associated with the media content stream, previously played content, skipped pieces of media content, and previously indicated user preferences. For example, the context database may include information that a content stream to an electronic device currently is presenting a song, at 1 minute and 23 seconds into the song, as well as all the songs played in the last hour and the next 20 songs in the playlist. In some implementations, the server system 120 transmits the context associated with a media content stream to the device that is presenting the content stream so that one or more items of context information can be used by the device, such as for display to the user. In some implementations, when the device to which the media content is being streamed changes, the server system 120 transmits the context associated with the active media content to the newly active device.

Figure 2:
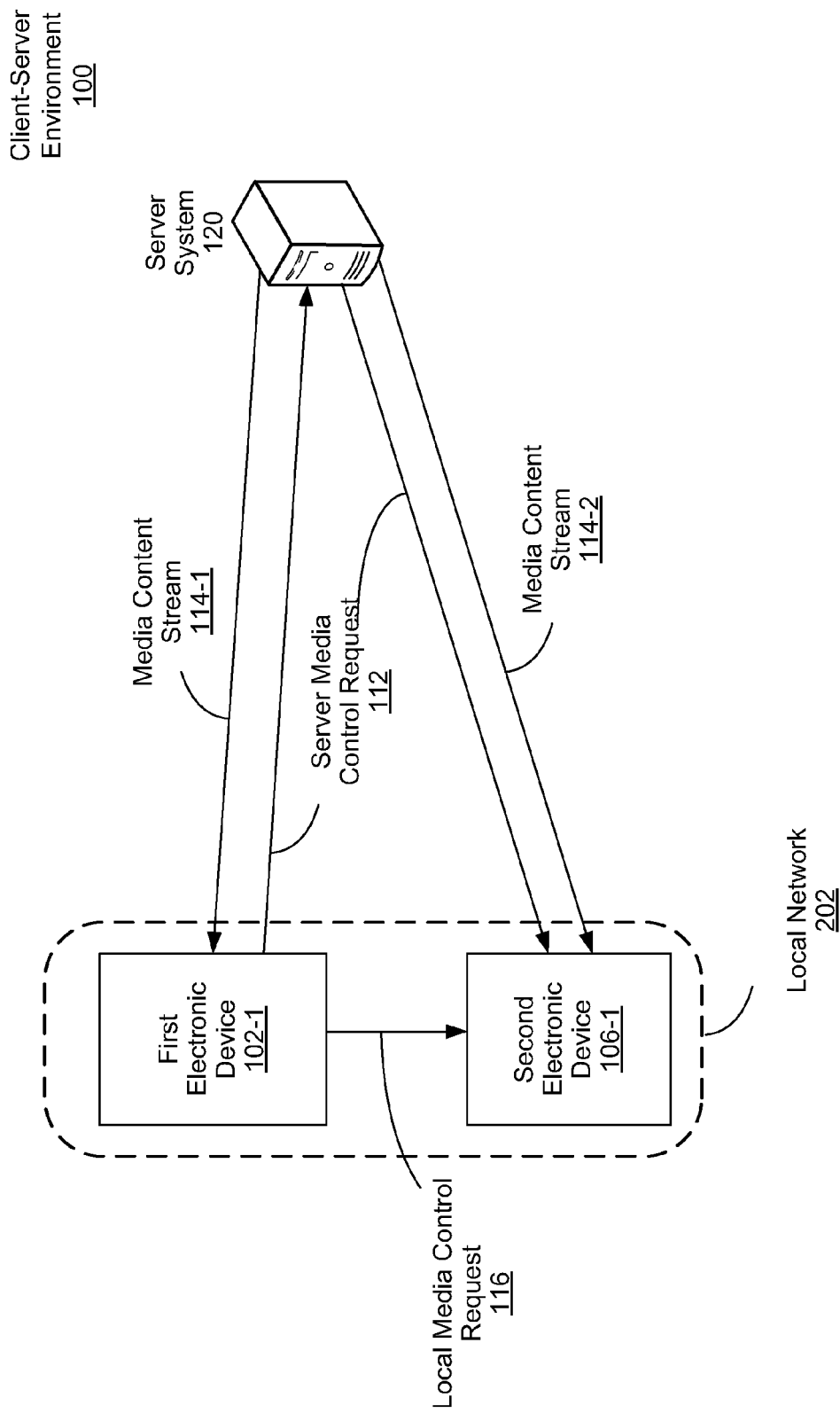
FIG. 2 is a block diagram illustrating a client-server environment in accordance with some implementations.

FIG. 2 is a block diagram illustrating a client-server environment 100 in accordance with some implementations. The client-server environment 100 includes a local network 202 that encompasses at least a first electronic device 102-1 and a second electronic device 106-1. Client-server environment 100 also includes a server system 120 that is located remotely from and is not integrated into the local network. In some implementations, the server system 120 stores media content and streams the stored media content to remote electronic devices upon request. In some implementations, the local network 202 is a Local Area Network, and the server system 120 is not within the IP address space of the Local Area Network. Thus, the server system 120 communicates with either the first or the second electronic devices (102-1, 106-1) via the Internet. For example, the media content streams 114-1, 114-2, and the server media control requests 112, discussed below, may be transmitted via the Internet.

In some implementations, a user of the first electronic device 102-1 uses an application running on the first electronic device 102-1 to send a server media control request 112 to the server system. In some implementations, the server media control request 112 includes information identifying a second electronic device to which the control request is addressed, as well as a payload that indicates what media control operation is to be performed by the second electronic device. As noted above, in some implementations, media control requests include requests to control aspects of the media that is being presented on the second electronic device 106-1, including but not limited to commands to initiate media presentation, cease media presentation, pause, skip, fast-forward, rewind, adjust volume, change the order of items in a playlist, add or remove items from a playlist, adjust audio equalizer settings, change or set user settings or preferences, provide information about the currently presented content (e.g., metadata), and the like.

In some implementations, in response to receiving the server media control request 112, the server system 120 forwards the server media control request 112 to the second electronic device 106-1. When received by the second electronic device 106-1, the server media control request 112 causes the second electronic device to initiate the media control operation indicated by the request. In some cases, this will include communicating with the server system 120 to perform any of the operations described above that may be requested by a media control request. In some cases, the second electronic device 106-1 will not need to establish any subsequent communication in response to receiving the server media control request 112, such as when the control request is for changing the volume, muting the speakers, changing equalizer settings, etc., as these operations can often be performed by the second electronic device 106-1 alone.

In some implementations, in response to receiving the server media control request 112, the server system 120 will perform an operation requested by the server media control request 112 without forwarding the request to the second electronic device 106-1. For example, if the server media control request 112 contains a request to initiate presentation of media content at the second electronic device 106-1, the server system 120 may simply begin sending the media content to the second electronic device 106-1 (e.g., via the media content stream 114) without also forwarding the server media control request 112 to the second electronic device 106-1. However, even where the server system 120 executes some types of media control operations upon receiving the request from the first electronic device 102-1 (and without forwarding the request to the second electronic device 106-1), the server system 120 still forwards some types of media control requests to the second electronic device 106-1. For example, a server media control request 112 that corresponds to a request to increase or decrease speaker volume, or any other request that can only be executed by the second electronic device 106-1, are forwarded to the second electronic device 106-1, even though requests to initiate presentation of media content may not be forwarded.

In some implementations, the first electronic device 102-1 also sends a local media control request 116 directly to the second electronic device 106-1 at substantially the same time that it sends the server media control request 112 to the server system 120. In some implementations, the local media control request 116 is configured to initiate the same media control operation as the server media control request 112.

In some implementations, the local media control request 116 is sent via the local network 202 (e.g., a Local Area Network, a Personal Area Network, a peer-to-peer connection, etc.). In implementations where the local network 202 is a Local Area Network that establishes IP address space behind a traffic routing device, the local media control request 116 is sent to the second electronic device 106-1 without sending the local media control request 116 to devices that are not within the IP address space of the Local Area Network, and/or without sending the local media control request 116 through a public domain name system. Sending a local media control request 116 to the second electronic device 106-1 over the Local Area Network, in addition to sending the server media control request 112 over the Internet to the sever system 120, allows for two separate, redundant pathways for delivering the media control request to the second electronic device. This can allow the second device to react more quickly and more reliably to the media control request of the first electronic device 102-1. For example, if either connection path between the first and second electronic devices is not available, is improperly configured, or the like, the other connection path can ensure that remote-control functionality is still available. Moreover, this allows a service provider (e.g., a provider of software and/or devices that are configured to present media content) to provide a robust remote control solution that reduces the necessary technical knowledge of the end user, and is more likely to work in many different communication networks and environments (e.g., where a user's internal router is not configured for internal LAN communications, where an active Internet connection does not exist, etc.).

In some implementations, the server media control request 112 and the local media control request 116 are identical. For example, they may contain the same message, such as "Device {UserX/Home Stereo}; Operation{Play: UserX/Party Mix}." Upon receiving this message, each device may respond by performing a predefined set of operations. For example, in some implementations, the server system 120 begins streaming media content associated with User X's "Party Mix" playlist to User X's Home Stereo system. Similarly, the second electronic device 106-1 (here, the home stereo system), upon receiving the same message in the local media control request 116, sends a request to the server system 120 to initiate playback of the same media content. Because multiple control requests that are configured to initiate the same media control operation are sent from the first electronic device, some implementations provide systems and methods for handling duplicate or conflicting control requests, so that media control operations are not repeated, and to ensure that new and/or different media control requests are not ignored. Some examples of this are described below with reference to FIGS. 7-8.

In some implementations, the server system 120 performs the media control request without forwarding it to the second electronic device 106-1. In this case, executing the requested operation includes streaming media content associated with User X's "Party Mix" playlist to User X's Home Stereo system. In some implementations, the server system 120 forwards the message to the second electronic device 106-1. The forwarded message may be the identical message, or it may be modified or translated before it is forwarded to the second electronic device 106-1. In implementations where the message is forwarded, it may be forwarded instead of or in addition to the server system 120 executing the requested operation. Upon receipt of the forwarded message, the second electronic device 106-1 may then send a request to the server system 120 to initiate playback of the requested content.

In some implementations, the server system 120 may be configured to initiate a media control request (e.g., streaming media to the second electronic device 106-1) only if the request originates from the device at which the media is to be presented, and not if it originates from a different device. For example, in contrast to the example above where the server system 120 begins streaming media to the second electronic device 106-1 in response to a request from the first electronic device 102-1, the server system 120 instead would only begin streaming media to the second electronic device 106-1 if the request came directly from the second electronic device itself. In such implementations, the server 120 may be configured to forward all media control requests to the second electronic device 106-1 prior to executing them, as described above, so that the second electronic device 106-1 can determine whether, when, and how to execute the request. In some implementations, the second electronic device 106-1 (and/or the server system 120) determines the authenticity, trustworthiness, and/or origin of a media control request before it executes the request or initiates the operation.

In some implementations, the server media control request 112 and the local media control request 116 are not identical (e.g., the message is in a different form, or contains more, less, or different information), but are both configured to initiate the same media control operation by the second electronic device. For example, in some implementations, the server media control request 112 includes a command to begin delivering content to the second electronic device 106-1, while the local media control request 116 includes a command to cause the second electronic device 106-1 to issue a request to the server system 120. The request from the second electronic device 106-1 to the server system 120 in response to receiving one of the server media control request 112 and the local media control request 116 may be described as a third media control request (not shown). The form and content of the third media control request may be the same as or different from the server media control request 112 and the local media control request 116. In either case, the third media control request will be configured to cause the same media control operation as those requests. Accordingly, though these requests are configured to cause different processes to be performed by different devices (e.g., causing the server to begin streaming media to the second electronic device, or cause the second electronic device to request that media from the server), they ultimately cause the same ultimate media control operation to be initiated (e.g., presentation of the media by the second electronic device).

As noted above, in some implementations, a media control request is configured to switch the active media presentation device from one device (e.g., a user's mobile phone) to another (e.g., a user's home stereo system). In some implementations, this includes changing the device to which the server system 120 is streaming media content. For example, a user who is listening to a music playlist on a mobile phone can request that the music be played through a home stereo system instead of (or in addition to) the mobile phone. In some implementations, the request to change media presentation devices is initiated by a user (e.g., via a user interface on the mobile phone), and in some implementations the request is initiated automatically (e.g., based on the location of the mobile phone, the proximity of the mobile phone to the home stereo system, the time of day, the day of the week, and/or user identities).

FIG. 2 also illustrates how the destination of a media content stream can be changed from one device to another in a client-server environment. In some implementations, the first electronic device 102-1 is receiving a media content stream 114-1 from the server system 120. For example, the first electronic device 102-1 may be a mobile phone receiving streaming music from the server system 120. A device within the client-server environment 100 then requests that the media also, or instead, be presented by the second electronic device 106-1. This request may come from the first and/or the second electronic device (or any other device within the environment), and may be initiated by a user, or it may be initiated automatically. For example, the user may, upon returning home, request that the music that she is listening to on the mobile phone instead by presented by the second electronic device 106-1. In some implementations, the request to change the active presentation device is sent via the local and server media control requests 116, 112. Upon receiving and/or processing a request, the server system 120 begins sending the media control stream 114-2 to the second electronic device 106-1. The media content stream 114-1 that was being sent to the first electronic device 102-1 may continue or may be terminated, depending on factors such as an explicit user request, historical usage patterns, predefined preferences, etc.

In some implementations, second electronic devices 106-*n* buffer/cache a portion of the same media stream that is being presented by the first electronic device 102-1, so that when the second electronic device 106-*n* is selected to begin presentation of the media content, the second electronic device 106-*n* begins presenting the media content seamlessly and without interruption. Buffering and/or caching of media content is discussed in greater detail below with reference to FIGS. 6A-6B.

In some implementations, as noted above, the context of the media content stream 114-1 is available to the second electronic device 106-1 once it begins receiving the media content stream 114-2. For example, information such as the current location within a playlist, recent play history, recent changes to a playlist, etc., are all available to the second electronic device 106-1, and may be viewed, used, modified, or otherwise operated on by a user through a user interface associated with the second electronic device 106-1. In some implementations, the context information is stored in the context database 126 of the server system 120.

Also, as noted above, in some implementations, the second electronic device 106-1 buffers/caches a portion of the content that is being streamed to the first electronic device 102-1, in case the user should choose to begin media presentation by the second device instead of or in addition to the first device. In some implementations, the second electronic device 106-1 caches/buffers a predetermined portion of the media content that is being streamed to the first electronic device 102-1, such as the next 10 seconds, 20 seconds, 30 seconds, 1 minute, etc. In some embodiments, the second electronic device 106-1 receives information about the current media playback location from the first electronic device 102-1 and/or the server system 120, such that when the second electronic device 106-1 receives a command to begin presenting the media content, it begins presentation at substantially the same position as the first electronic device 102-1.

In some implementations, the server system 120, the first electronic device 102-1, and the second electronic device 106-1 are configured to present media content regardless of the particular device on which the media content is stored. For example, as described above, media content can be stored at the server system 120 (e.g., in the media content database 124), and streamed to the first and/or the second electronic devices. However, media content may also be stored at the first and/or the second electronic devices (or other storage devices accessible to the first and/or second electronic devices, such as a NAS). This media content may be made accessible for presentation by any capable device associated with a user, even though the media content may not be available from the server system 120. For example, in some implementations, a playlist on a first electronic device (e.g., a user's mobile phone) may include media content that is stored on that device's own memory, as well as media content that must be streamed from a different source, such as a remote server (e.g., server system 120) or storage device within the local network 202 (e.g., a NAS). When the user plays back the playlist at the first electronic device, that device can switch between retrieving media content from its own memory and the different source, depending on where the media content item is stored. However, if the user wished to instead playback the playlist from a second electronic device (e.g., the user's home audio system), the second electronic device may not have the same media content stored in its memory as the first electronic device. Thus, in accordance with some implementations, media content that is stored on one device in the local network 202 (e.g., on first or second electronic devices 102-*n*, 106-*n* and/or on any device within a client environment 108-*n*, such as a NAS) may be streamed to another device within the local network 202 when its turn in the playlist arrives. Accordingly, the user need not worry about where any given media content item is stored, because the media may be streamed from either remote or local sources, or both.

In some implementations, music stored locally on the first electronic device is streamed to the second electronic device via local communication paths (e.g., within a Local Area Network) when that music is not available from a remote source associated with a media content provider (e.g., the server system 120). In some implementations, music stored on a first electronic device, but not available from the media content provider, is streamed to the server associated with the media content provider, and then streamed from the server associated with the media content provider to the second electronic device. Accordingly, media that is stored on one device may be accessible to another device seamlessly and without having to download, transfer, or otherwise duplicate the media content on multiple devices. Also, this process may be seamless to the user, such that the same controls and inputs are used both for causing a second device to stream media from a remote source, and for causing locally stored media to be streamed to the second device via local communication paths.

Figure 3:
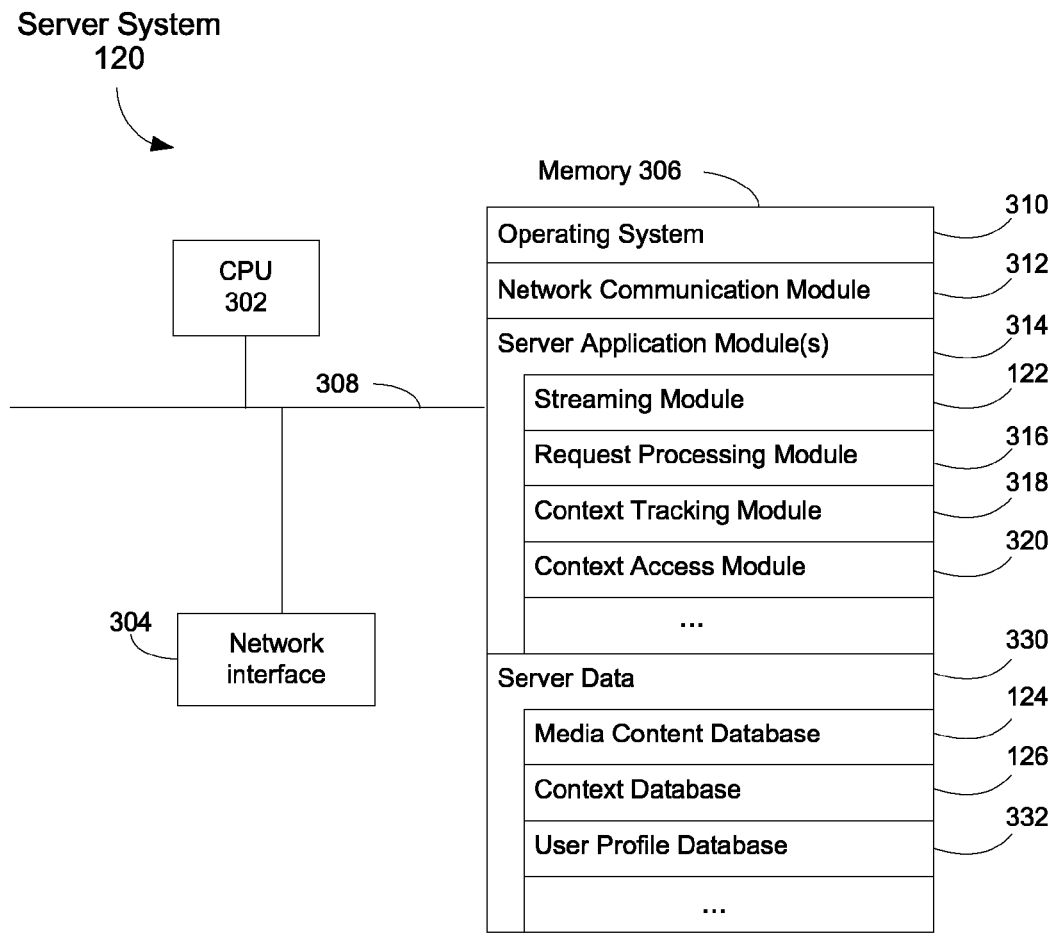
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components.

Memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other Wide Area Networks, Local Area Networks, Personal Area Networks, metropolitan area networks, VPNs, and so on;
- one or more server application module(s) 314 for enabling the server system 120 to perform the functions offered by the server system 120, including but not limited to:
  - a streaming module 122 for streaming media content to an electronic device (e.g., first and second electronic devices 102-*n*, 106-*n*, FIG. 1) remote from the sever system 120;
  - a request processing module 316 for receiving requests from electronic devices (e.g., first and/or second electronic devices 102-*n*, 106-*n*, FIG. 1), wherein the requests include requests to stream specific media content to the electronic devices and/or requests to change the destination of the media content stream (e.g., media content stream 114, FIG. 2) from a first electronic device to a second electronic device;

a context tracking module 318 for tracking and storing the context of a media content stream (e.g., media content streams 114-1, 114-2, FIG. 2), including storing, among other data, the current playback position in a media content stream that is currently being presented by an electronic device (e.g., first and/or second electronic devices 102-n, 106-n, FIG. 1), the position in a current playlist, the play history of a user, the preferences of a user, previously skipped media content, whether media content items were "liked" or "disliked" (e.g., via "starred," "thumbs-up," and/or "thumbs-down" indications), and the like;

a context access module 320 for allowing electronic devices (e.g., first and/or second electronic devices 102-n, 106-n, FIG. 1) associated with a given user account to access the current context for media content streams associated with the given user account; and one or more server data module(s) 330 for storing data related to the data server system 120, including but not limited to:

media content database 124 including a library of media content;

a context database 126 including information associated with one or more media content streams (e.g., media content streams 114-1, 114-2, FIG. 2), wherein context information includes the current playback position in a media content stream, metadata relating to the media, a position in a playlist, play history of a user, user preferences, skipped media, and user settings; and a user profile database 332 including account information for a plurality of users, each account including user media histories, user preferences, and determined user interests.

Figure 4:
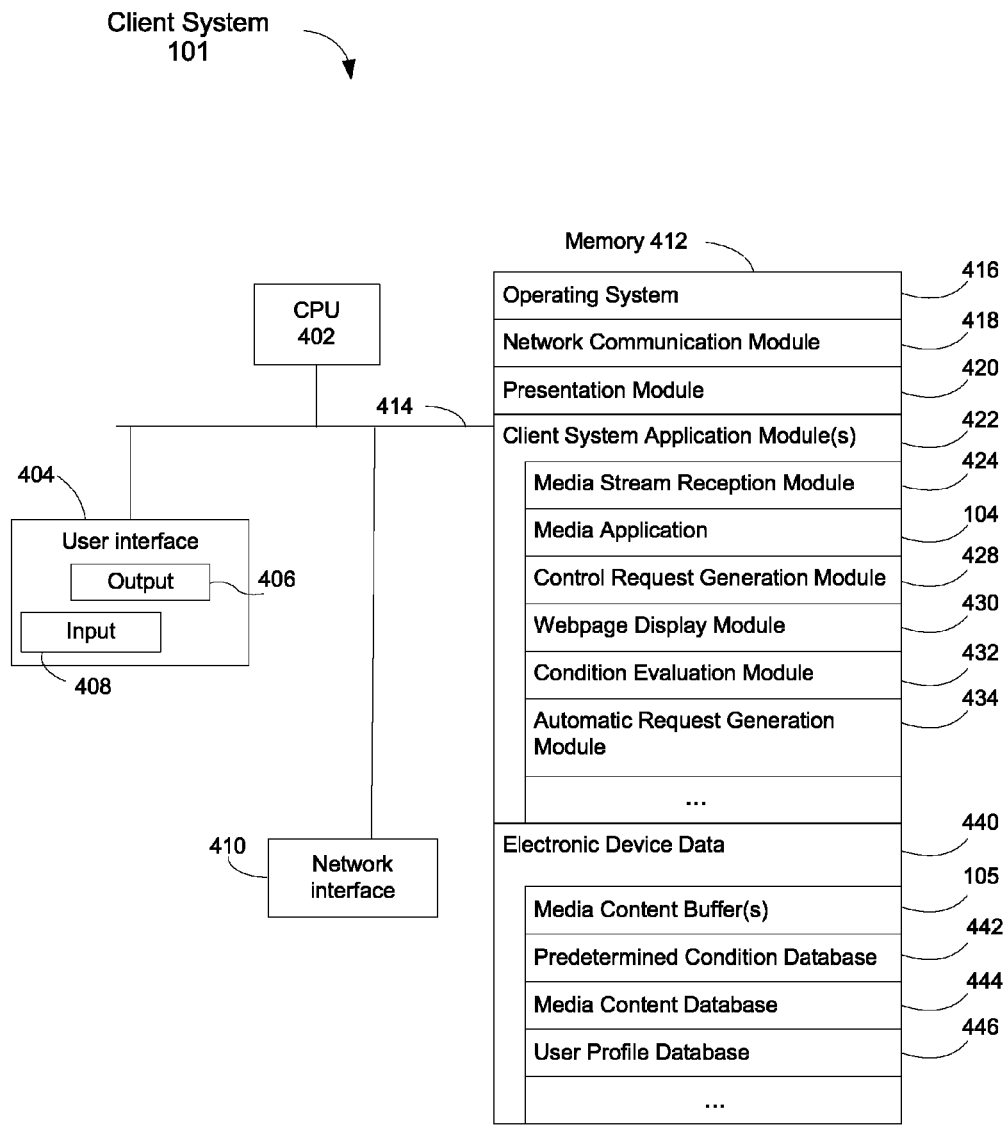
FIG. 4 is a block diagram illustrating an electronic device in accordance with some implementations.

FIG. 4 is a block diagram illustrating a client system 101, in accordance with some implementations. In some implementations, the client system 101 represents first electronic devices 102-n and/or second electronic devices 106-n. The client system 101 typically includes one or more processing units (CPUs) 402, one or more network interfaces 410, memory 412, and one or more communication buses 414 for interconnecting these components. The client system 101 includes a user interface 404. The user interface 404 includes user interface elements that enable output 406 to be presented to a user, including via speakers or a visual display. The user interface 404 includes user interface components that facilitate user input 408 such as a keyboard, a mouse, a voice-command input unit, a touch sensitive display, or other input buttons 408. In some implementations, the client system 101 is a wireless device, such as a mobile phone. Furthermore, some client systems 101 use a microphone and voice recognition to supplement or replace the keyboard.

Memory 412 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, includes a non-transitory computer readable storage medium. In some implementations, memory 412 or the computer readable storage medium of memory 412 stores the following programs, modules and data structures, or a subset thereof:

an operating system 416 that includes procedures for handling various basic system services and for performing hardware dependent tasks;

a network communication module 418 that is used for connecting the client system 101 to other computers via the one or more communication network interfaces 410 (wired or wireless) and one or more communication networks, such as the Internet, other Wide Area Networks, Local Area Networks, Personal Area Networks, metropolitan area networks, VPNs, local peer-to-peer and/or ad-hoc connections, and so on;

a presentation module 420 for enabling presentation of media content at the client system 101 through the output mechanisms 406 associated with the user interface 404 (e.g., screens, speakers, headphones, etc.);

one or more client system applications module(s) 422 for enabling the client system 101 to perform the functions offered by the client system 102, the application module(s) 422 including but not limited to:

a media stream reception module 424 for receiving (and, in some implementations, transcoding) a media content stream (e.g., media content stream 114-n, FIG. 2) from a server system (e.g., server system 120, FIG. 2), the media content stream including data needed to present media content at the client system 101 and context data for the media content stream, wherein the media content stream can include a variety of media types including, but not limited to, audio media such as music, radio, audio books, and podcasts, video media such as internet videos, television programming, movies, digital photographs, and any other type of digitally transmissible media (e.g., games, images, advertisements, etc.);

a media presentation and control application 104 for presenting media content by the electronic device 102, for controlling media presentation by other electronic devices, and for interacting with the server system 120;

a control request generation module 428 for, in response to user input, generating a server media control request for transmission to the server system (e.g., server media control request 112, FIG. 2) and a local media control request for transmission to the second electronic device (e.g., local media control request 116, FIG. 2) via a Local Area Network, VPN, BLUETOOTH, peer-to-peer, etc.;

a webpage display module 430 (including, e.g., a web browser) for displaying a webpage published by a third party;

a condition evaluation module 432 for determining whether a predetermined condition is met; in some implementations, the condition evaluation module 432 periodically determines whether any predetermined condition has been met; and an automatic request generation module 434 for, in response to a determination by the condition evaluation module 432 that a predetermined condition is met, generating a request for transmission to the server system without any direct user input;

an electronic device data module 440 for storing data, including but not limited to:

media content buffer(s) 105 including media content data received from a stream from the server system (e.g., server system 120, FIG. 2) and stored in the memory of the client system 101 until it is presented by the client system 101;

predetermined condition database 442 including, but not limited to, one or more predetermined conditions, established by the user of the electronic device 102, that determine whether a media control request to change the destination of the media content stream (e.g., media content stream 114-1, FIG. 2) from the server system should be automatically generated;

media content database 444 for storing, on the local device, media content that is part of the user's personal library of media content; and a user profile database 446 including account information for a specific user of the client system 101 including user media history, user preferences, determined user interests, and account credentials.

FIGS. 5-8 are flow diagrams illustrating a process of controlling media presentation at an electronic device, in accordance with some implementations. Each of the operations shown in FIGS. 5-8 may correspond to instructions stored in a computer memory or computer readable storage medium. Optional operations are indicated by dashed lines (e.g., boxes with dashed-line borders).

Figure 5:
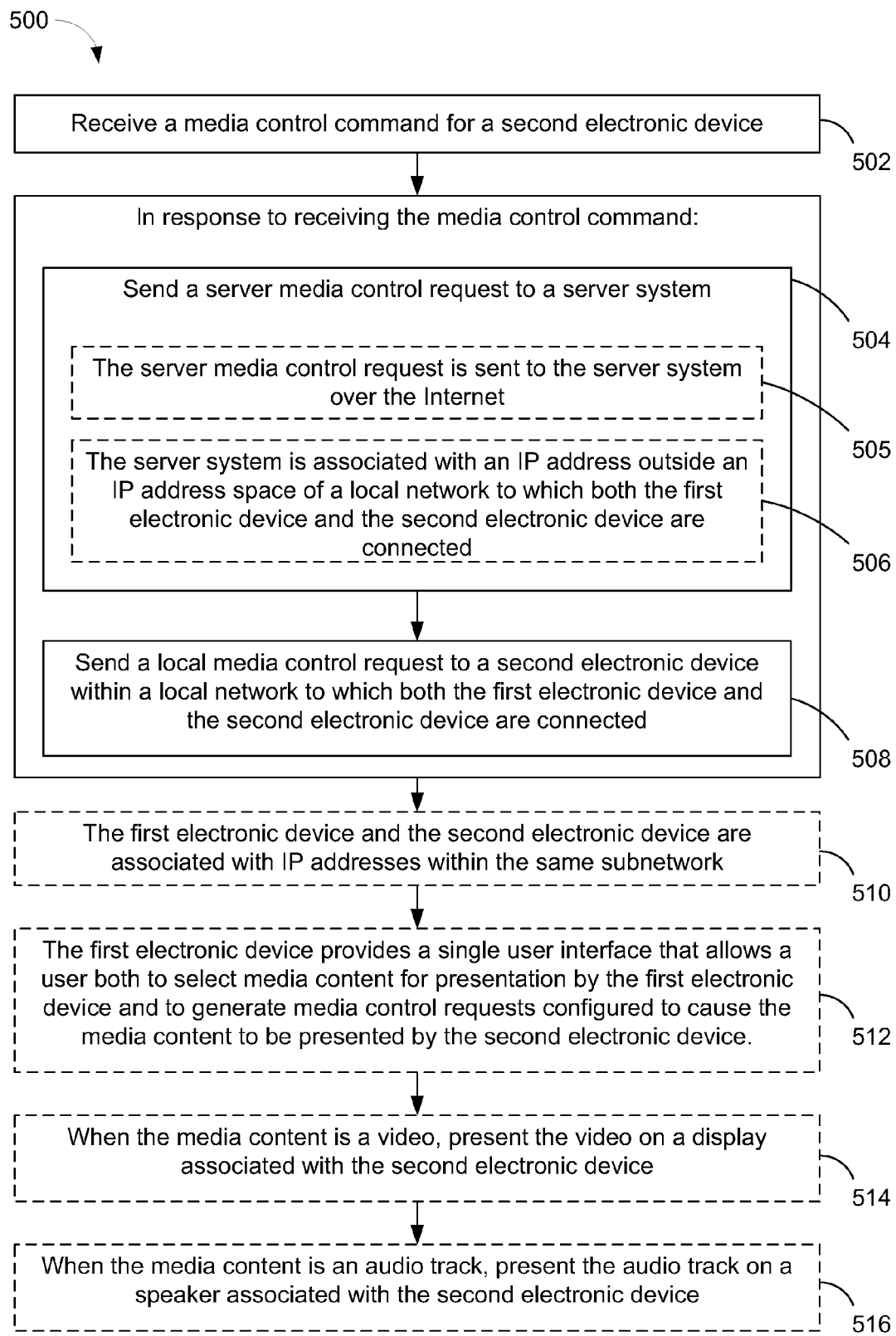
FIG. 5 is a flow diagram illustrating a method of controlling media presentation, performed by a first electronic device, in accordance with some implementations.

With reference to FIG. 5, in some implementations, the method 500 is performed at a first electronic device having one or more processors and memory storing one or more programs for execution by the one or more processors. In some implementations, method 500 corresponds to a method whereby a first electronic device sends both a local media control request and a server media control request in response to a media control command being received at the first electronic device.

In some implementations, the first electronic device corresponds to the first electronic device 102-1, discussed above (also described with respect to FIG. 4). A media control command for a second electronic device is received (502). In some implementations, the media control command corresponds to a user input. In some implementations, the user input is received via user interface 404 of the first electronic device 102-1. For example, the user may select a song for playback by pressing a representation of the song (e.g., an icon, title, etc.) on a touchscreen of a mobile phone. In some implementations, the first electronic device is selected from the group consisting of: a computer, a mobile phone, a remote control device, a portable media player, and the like. In some implementations, the second electronic device is selected from the group consisting of: a television, a home media receiver/player, a computer, a home audio/visual system, a speaker, and the like. In some implementations, any of the identified devices, and other devices not explicitly listed, may be a first electronic device or a second electronic device.

In response to receiving the media control command, a server media control request is sent to a server system (504). In some implementations, the server system corresponds to the server system 120, discussed above. In some implementations, the server media control request is sent to the server system over the Internet (505). In some implementations, the server system is associated with an IP address outside an IP address space of a local network to which both the first electronic device and the second electronic device are connected (506).

Also in response to receiving the media control command, a local media control request is sent to a second electronic device within a local network to which both the first electronic device and the second electronic device are connected (508). In some implementations, the local network is a Local Area Network, as discussed above. In some implementations, the first electronic device and the second electronic device are associated with IP addresses within the same subnetwork (510). The local media control request is sent over any communication type that allows communication between the two electronic devices without having to leave the local network. In some implementations, the local media control request is sent via Wi-Fi, BLUETOOTH, or the like.

In some implementations, the server and the local media control requests are both configured to cause a single media control operation to be implemented at the second electronic device. For example, if a user inputs a media control command into a mobile phone requesting that the song "Jessie's Girl" be presented by a second electronic device, such as a home media system, the mobile phone will send two media control requests that are each configured to cause the home media system to begin playback of "Jessie's Girl." Sending both media control requests increases the speed with which the second electronic device responds to the request and the reliability of the request being received. In some implementations, the second electronic device has already buffered some of the requested media content and can therefore begin presenting that content without needing to wait for the arrival of a media content stream from the server system, as discussed below. Also, the local and server media control requests need not contain identical data, but they are configured to cause the same media control operation to occur at the second electronic device. In some implementations, the media control operation is selected from the group consisting of: play, pause, skip, fast-forward, rewind, adjust an audio volume, change an order of items in a playlist, add items to a playlist, remove items from a playlist, adjust audio equalizer settings, set a user setting, and the like. In some implementations, the local and server media control requests include information specifying a particular electronic device from a group of available electronic devices to be controlled as the second electronic device.

In some implementations, the first electronic device provides a single user interface that allows a user both to select media content for presentation by the first electronic device and to generate media control requests configured to cause the media content to be presented by the second electronic device (512). For example, as described above, a user can control playback of media content at the device that is presenting the user interface (e.g., a mobile phone that is displaying a media player application) and also control playback of media content at a different device (e.g., a home media system or remote speaker) using the same application and/or user interface. Thus, the user need not switch between applications or user interface environments in order to control the various devices, including the device on which the user interface is presented.

In some implementations, the media content is selected from the group consisting of, but not limited to: an audio track, a video, an image, an audio playlist, and a video playlist. In some implementations, when the media content is a video, the video is presented on a display associated with the second electronic device (514). In some implementations, when the media content is an audio track, the audio track is presented on a speaker associated with the second electronic device (516).

Figure 6A:
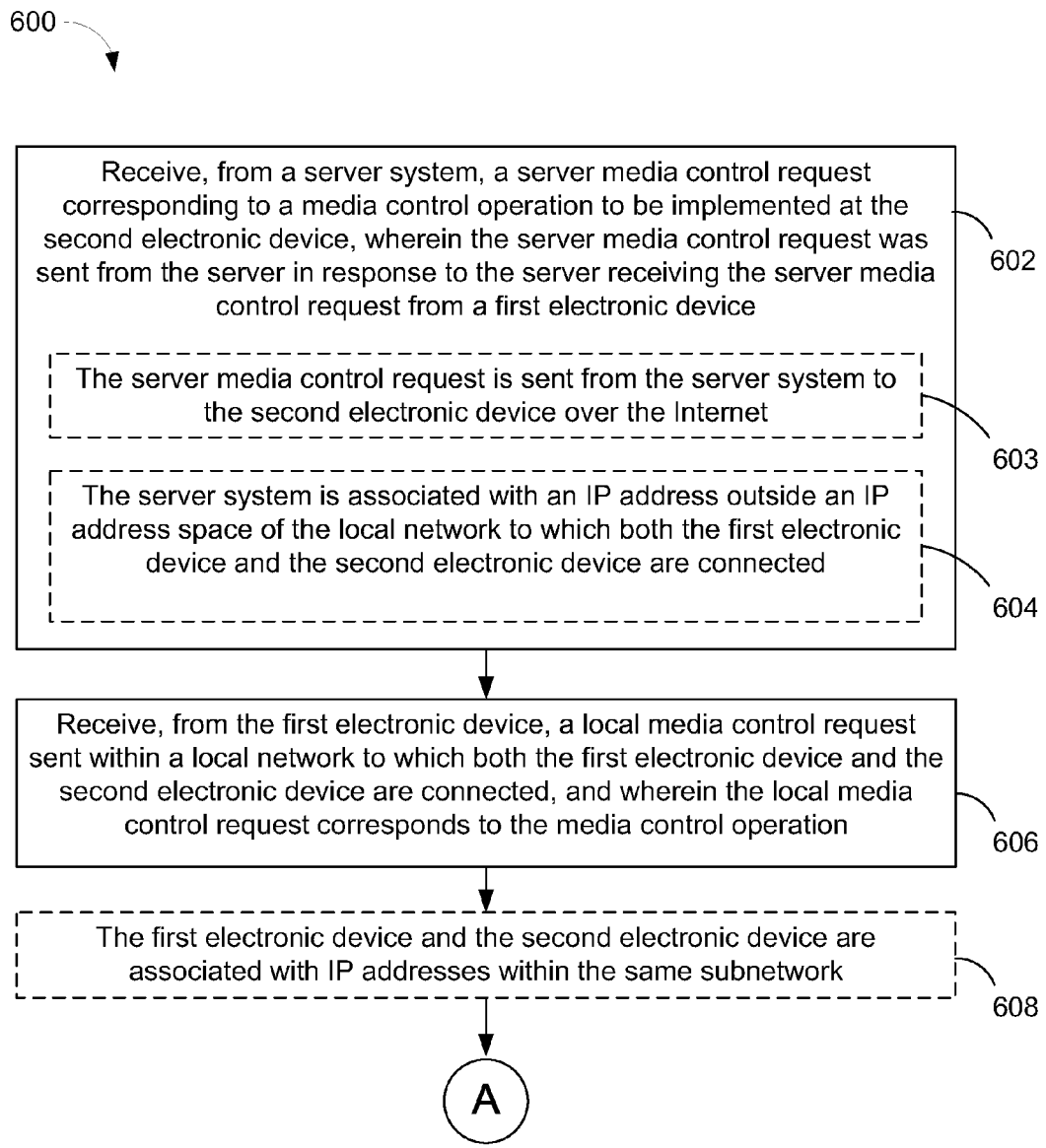
FIGS. 6A-6B are flow diagrams illustrating a method of controlling media presentation, performed by a second electronic device, in accordance with some implementations.
Figure 6B:
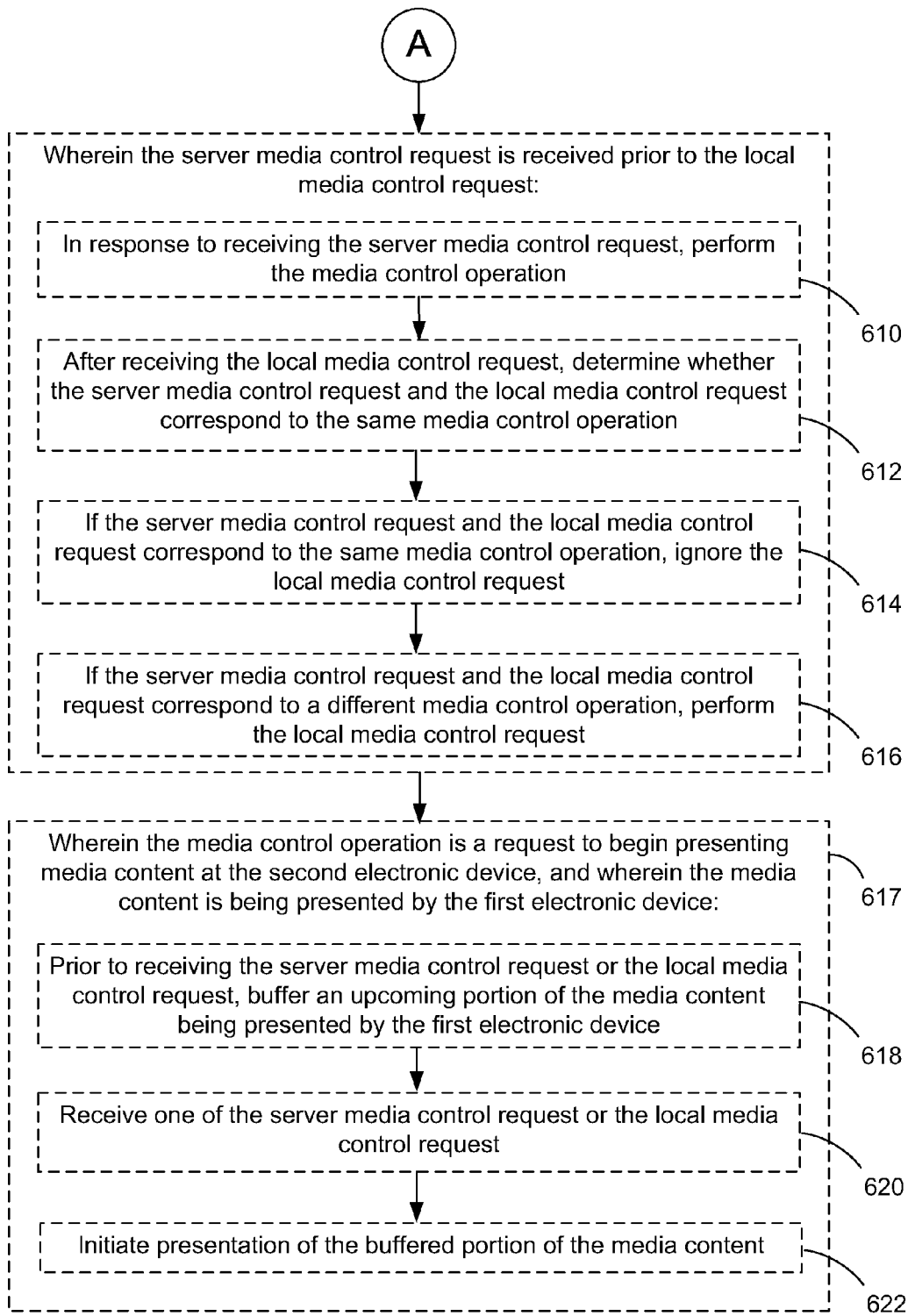

FIGS. 6A-6B are flow diagrams illustrating a method 600 of controlling media presentation at an electronic device, in accordance with some implementations. In some implementations, the method 600 is performed at a second electronic device having one or more processors and memory storing one or more programs for execution by the one or more processors (e.g., second electronic device 106-n, FIG. 1). For example, the second electronic device may be a home media system, television, computer, or the like. In some implementations, the method 600 corresponds to a method implemented in conjunction with and/or in response to the method 500.

In some implementations, the method 600 corresponds to an implementation where media control requests that are sent to the server system from the first electronic device (e.g., the server media control request 112, FIG. 2) are forwarded to the second electronic device without the server system attempting to perform the media control operation. Thus, the server system acts as a relay or forwarding service for a media control request from the first electronic device. This may be used in implementations where a media control request is only performed if the request originates from the device that is to perform the action (or that is to be impacted by the action). For example, a device acting as a remote control cannot alone cause the server to begin streaming media to a second electronic device, because the control request did not originate from the second electronic device. Rather, the second electronic device must itself make the request to the server. Accordingly, the server forwards the media control request to the second electronic device, and the second electronic device can then perform an operation to satisfy the request (e.g., requesting media content from the server, changing a media presentation setting, etc.).

With reference to FIG. 6A, a server media control request corresponding to a media control operation to be implemented at the second electronic device is received from a server system, wherein the server media control request was sent from the server in response to the server receiving the server media control request from a first electronic device (602). In some implementations, the server media control request is sent from the server system to the second electronic device over the Internet (603). In some implementations, the server system is associated with an IP address outside an IP address space of a local network to which both the first electronic device and the second electronic device are connected (604).

A local media control request sent within a local network to which both the first electronic device and the second electronic device are connected is received from the first electronic device, wherein the local media control request corresponds to the media control operation (606). In some implementations, the local network is a Local Area Network, as discussed above. In some implementations, the first electronic device and the second electronic device are associated with IP addresses within the same subnetwork (608). The local media control request is sent over any communication type that allows peer-to-peer communication between the two electronic devices without having to leave the local network. In some implementations, the local media control request is sent via Wi-Fi, BLUETOOTH, or the like.

Because the second electronic device may receive the server media control request and the local media control request from different sources and via different communication paths, the requests may not arrive in a consistent or predictable order. That is, in some cases, the local media control request may arrive before the server media control request, while in other cases, the order is reversed. However, a subsequently received media control request may not be a duplicate of the prior request, and so it should not be ignored simply because it was received shortly after another request. Accordingly, in some implementations, the second electronic device will determine whether to perform or ignore the media control requests based on various factors, as described with respect to FIG. 6B.

Method 600 continues on FIG. 6B. In some implementations, when the server media control request is received prior to the local media control request, the following steps are performed. The media control operation is performed in response to receiving a server media control request (610). After receiving a local media control request, it is determined whether the server media control request and the local media control request correspond to the same media control operation (612). If the server media control request and the local media control request correspond to the same media control operation, the local media control request is ignored (614). In some implementations, if the server media control request and the local media control request correspond to different media control operations, the local media control request is performed (616). In cases where the local media control request is received prior to the server media control request, steps similar to (610)-(616) are employed to determine whether to ignore or perform the server media control request. Thus, the second electronic device is prevented from performing the same media control operation twice in succession, thus preventing possible pauses, jumps, or other interruptions in the media content presentation caused by the processing of both the local and the server media control requests.

In some implementations, whether the server media control request and the local media control request correspond to the same media control operation is determined using timestamps. For example, in some implementations, the server media control request includes a first timestamp and the local media control request includes a second timestamp. In some implementations, the first and the second timestamp both correspond to a time at which the first electronic device issued the media control requests. In some implementations, the first timestamp corresponds to a time at which the server system received a server media control request from the first electronic device, and the second timestamp corresponds to a time at which the first electronic device issued the local media control request. Accordingly, determining that the server media control request and the local media control request correspond to the same media control operation includes comparing the first and the second timestamps. If the timestamps are the same or substantially similar, it is determined that the local media control request and the server media control request correspond to the same media control operation, and the local media control request is ignored. In some implementations, timestamps are substantially similar if they are within 1 second. In some implementations, they are substantially similar if they are within 5 seconds. Other times may be used depending on the needs of any specific implementation. In some implementations, other time ranges are used to determine if timestamps are considered substantially similar. If the timestamps are not the same or substantially similar, it is determined that server media control request and the local media control request do not correspond to the same media control operation, and the local media control request is performed.

In some implementations, whether the server media control request and the local media control request correspond to the same media control operation is determined using assigned message identifiers. For example, in some implementations, a server media control request and a local media control request that correspond to the same media control operation are given the same message identifier when they are issued by the first electronic device. Accordingly, determining that the server media control request and the local media control request correspond to the same media control operation includes comparing the respective message identifiers. If they are the same, it is determined that a subsequently received media control request corresponds to the same media control operation as a previously received media control request, and the subsequent media control request is ignored. If they are different, then it is determined that the subsequent media control request corresponds to a new media control request, and it is performed. In some implementations, a message identifier is a unique or semi-unique group of numbers, letters, characters, combinations thereof, or any other computer recognizable identifier that is assigned to media control requests.

As discussed above, it may be desirable for users to cause media content that is being presented at one device to be transferred to another device for presentation at that device. For example, a user listening to music on a mobile phone may decide to switch the playback device from the phone to a home stereo system. In the process of terminating presentation at one device and initiating presentation at another, however, processing and communication delays can cause pauses or gaps in presentation that diminish the overall user experience. Accordingly, in some implementations, the second electronic device (e.g., the device that is to begin presenting media content) buffers an upcoming portion of media content that is being presented at the first electronic device (e.g., the device that is currently presenting the media content). In some implementations, the second electronic device is configured to buffer the upcoming portion of media content that is being presented at the first electronic device when the first electronic device is connected to the same local network (e.g., a LAN, a BLUETOOTH connection, etc.), when the first electronic device is within a predetermined proximity to the second electronic device (e.g., within the same building, room, floor, etc., as determined by a GPS, for example), and the like. In some implementations, one or more of the devices, including the first and second electronic devices and the server system, are configured to determine when and whether to buffer/cache media content at the second electronic device. Buffering media content at a second electronic device is discussed further with reference to steps (617)-(622).

In some implementations, the media control operation corresponding to one or more media control requests is a request to begin presenting media content at the second electronic device while the media content is being presented by the first electronic device (617). Prior to receiving the server media control request or the local media control request, an upcoming portion of the media content being presented by the first electronic device is buffered at the second electronic device (618). For example, the second electronic device may continuously receive and store a portion of the media content that is being presented at the first electronic device. In some implementations, the second electronic device receives the media content for buffering from the server system. The media content may be sent from the server system via the Internet. In some implementations, the second electronic device receives the media content for buffering from the first electronic device. In these implementations, the media content may be sent from the first electronic device via the local network. In some implementations, the buffered media content has a lower bit-rate than media content that is being presented and/or streamed for current presentation, thus helping to reduce bandwidth and network usage for the buffering technique. In some implementations, where the media content is audio, it is presented at a bit-rate of either about 160 kbps or 320 kbps, and it is buffered at about 96 kbps. Other bit-rates may be used for the presentation bit-rate and the buffering bit-rate, depending on factors such as available network speeds and capabilities, distances between devices, device capabilities, user preferences, and the like.

In some implementations, one of the server media control request or the local media control request is received at the second electronic device (620), and, in response, presentation of the buffered portion of the media content is initiated at the second electronic device (622).

Accordingly, when the second electronic device receives a command to begin presenting the media content, the presentation can begin without the additional time necessary to initialize a media content stream or otherwise download or receive the media content in a way suitable for continuous presentation. In some implementations, the second electronic device buffers about 5 seconds of the media content that is being presented by the first electronic device. In some implementations, it buffers about 10 seconds of the media content. In some implementations, it buffers more or less time, depending on the needs of any specific implementation.

In some implementations, the media content continues to be presented by the first electronic device in substantial synchronization with the presentation by the second electronic device. In some implementations, the media content ceases to be presented by the first electronic device when presentation begins at the second electronic device (although it may still be cached/buffered at the first electronic device, in some implementations).

Figure 7:
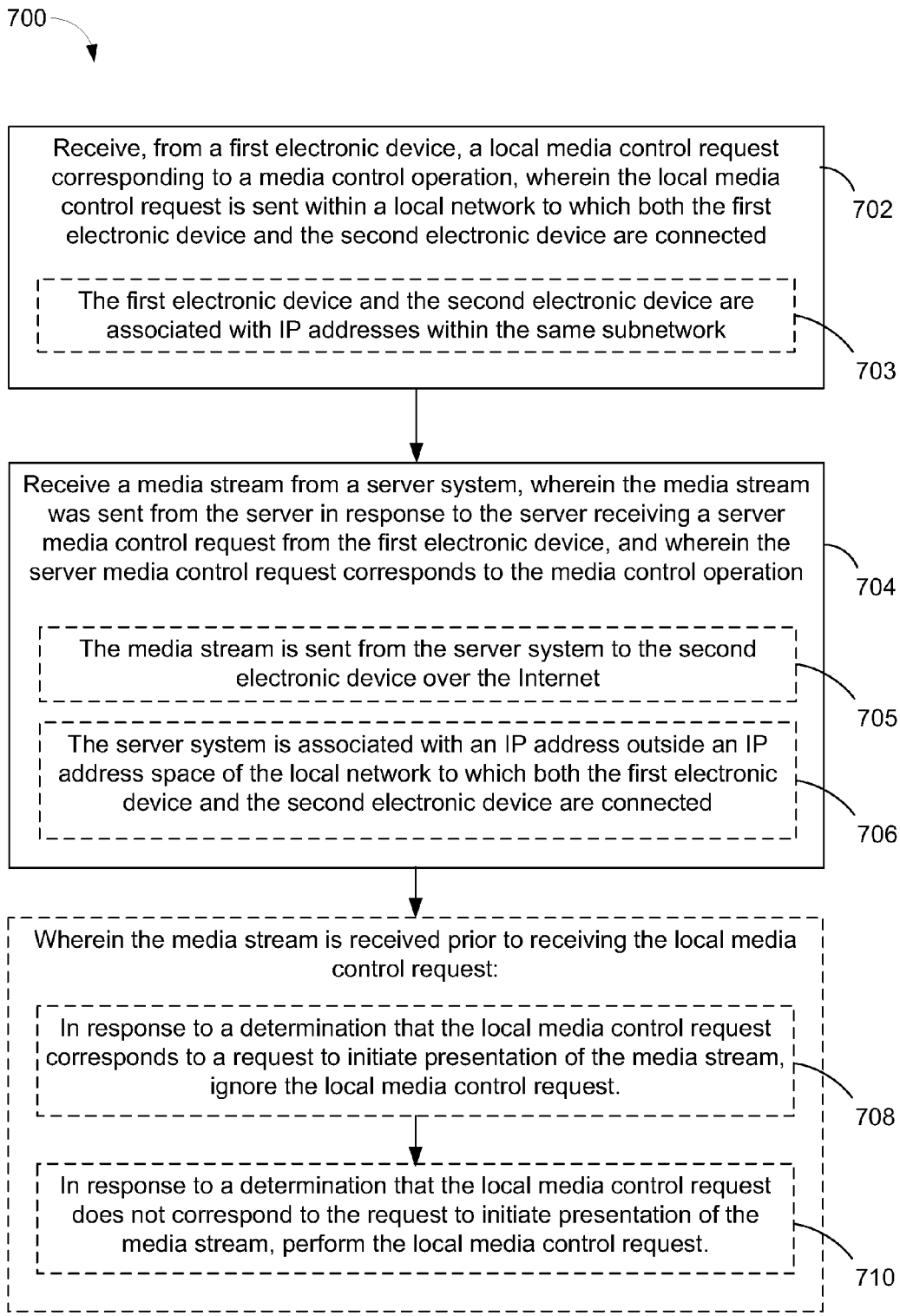
FIG. 7 is a flow diagram illustrating another method of controlling media presentation, performed by a second electronic device, in accordance with some implementations.

FIG. 7 is a flow diagram illustrating a method 700 of controlling media presentation at an electronic device in accordance with some implementations. In some implementations, the method 700 is performed at a second electronic device having one or more processors and memory storing one or more programs for execution by the one or more processors. For example, the second electronic device may be a home media system, television, computer, or the like. In some implementations, the method 700 corresponds to a method implemented in conjunction with and/or in response to the method 500. In some implementations, the method 700 corresponds to an implementation where media control requests that are sent to the server system (e.g., server system 120, FIG. 2) from the first electronic device (e.g., the server media control request 112, FIG. 2) are performed without first being forwarded to the second electronic device. Thus, the server system will take action when it receives a control request, even if the request originated from a different device than that which is to be acted upon. In some implementations, local media control requests (e.g., the local media control request 116, FIG. 2) are also received by the second electronic device after having been sent from the first electronic device, and are processed by the second electronic device when received, if appropriate.

With reference to FIG. 7, a local media control request corresponding to a media control operation is received from a first electronic device, wherein the local media control request is sent within a local network to which both the first electronic device and the second electronic device are connected (702). In some implementations, the local network is a Local Area Network, as discussed above. In some implementations, the first electronic device and the second electronic device are associated with IP addresses within the same subnetwork (703). The local media control request is sent using any communication type that allows communication between the two electronic devices without having to leave the local network. In some implementations, the local media control request is sent via Wi-Fi, BLUETOOTH, or the like.

A media stream is received from a server system, wherein the media stream was sent from the server in response to the server receiving a server media control request from the first electronic device, and wherein the server media control request corresponds to the media control operation (704). Accordingly, in this case, when the first electronic device requests a media control operation (e.g., initiated by a user or automatically), the second electronic device receives a local media control request, as well as a media stream that corresponds to that same media control request.

In some implementations, the media stream is sent from the server system to the second electronic device over the Internet (705). In some implementations, the server system is associated with an IP address outside an IP address space of a local network to which both the first electronic device and the second electronic device are connected (706).

Because the second electronic device receives both a media stream and a local media control request that may correspond to the same media control operation, the second electronic device should determine whether to perform a subsequently received local media control request. Accordingly, in some implementations, when the media stream is received prior to receiving the local media control request, the second electronic device determines whether to perform or ignore the local media control request. In some implementations, in response to a determination that the local media control request corresponds to a request to initiate presentation of the media stream, the local media control request is ignored (708). In some implementations, in response to a determination that the local media control request does not correspond to the request to initiate presentation of the media stream, the local media control request is performed (710). Thus, the second electronic device is prevented from performing the same media control operation twice in succession, thus preventing possible pauses, jumps, or other interruptions in the media content presentation.

In some implementations, whether the local media control request corresponds to a request to initiate presentation of the media stream is determined using timestamps. For example, in some implementations, the media stream includes a first timestamp, and the local media control request includes a second timestamp. In some implementations, the first and the second timestamp both correspond to a time at which the first electronic device issued the media control requests. In some implementations, the first timestamp corresponds to a time at which the server system received a media control request from the first electronic device, and the second timestamp corresponds to a time at which the first electronic device issued the local media control request. Accordingly, determining that the local media control request corresponds to a request to initiate presentation of the media stream includes comparing the first and the second timestamps. If the timestamps are the same or substantially similar, it is determined that the local media control request corresponds to the media stream, and the local media control request is ignored. In some implementations, timestamps are substantially similar if they are within 1 second. In some implementations, they are substantially similar if they are within 5 seconds. In some implementations, other time ranges are used to determine if timestamps are considered substantially similar. If the timestamps are not the same or substantially similar, it is determined that the local media control request corresponds to the media stream, and the local media control request is performed.

Figure 8:
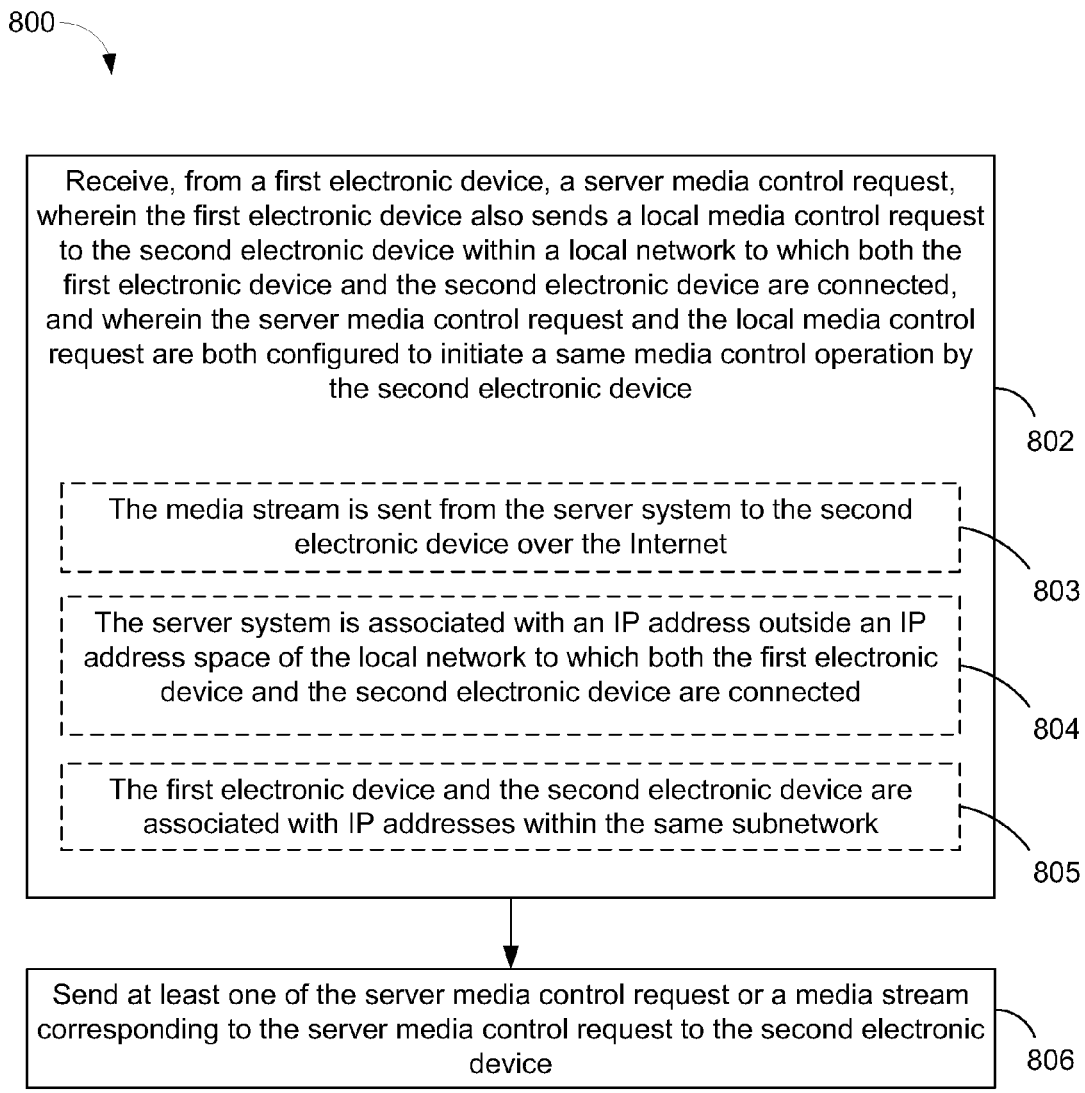
FIG. 8 is a flow diagram illustrating a method of controlling media presentation, performed by a server, in accordance with some implementations.

FIG. 8 is a flow diagram illustrating a method 800 of controlling media presentation, in accordance with some implementations. In some implementations, the method 800 is performed at a server system having one or more processors and memory storing one or more programs for execution by the one or more processors (e.g., server system 120, FIGS. 1-3).

A server media control request is received from a first electronic device (802). The first electronic device also sends a local media control request to the second electronic device within a local network to which both the first electronic device and the second electronic device are connected. The server media control request and the local media control request are both configured to initiate a same media control operation by the second electronic device. As described above, in some implementations, the server media control request is sent to the server system over the Internet (803). In some implementations, the server system is associated with an IP address outside an IP address space of a local network to which both the first electronic device and the second electronic device are connected (804). In some implementations, the local network is a Local Area Network. In some implementations, the first electronic device and the second electronic device are associated with IP addresses within the same subnetwork (805).

At least one of the server media control request or a media stream corresponding to the server media control request is sent to the second electronic device (806). In some cases, the server forwards all the server media control requests to the second electronic device. In some cases, the server performs the media control operation requested by the server media control request. For example, if the server media control request requests playback of media content at the second electronic device (e.g., a home media system), the server streams the media content to the second electronic device. In some implementations, the server performs some media control requests, but forwards others to the second electronic device. For example, requests to control playback of media content (including commands such as play, pause, skip, repeat, etc.) are performed by the server, while requests that relate specifically to the second electronic device (e.g., change the volume, change an input source, etc.) are forwarded to the second electronic device.

The methods illustrated in FIGS. 5-8 may be governed by instructions that are stored in a computer readable storage medium and that are executed by at least one processor of at least one server. Each of the operations shown in FIGS. 5-8 may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for controlling media presentation performed at a first electronic device having one or more processors and memory storing one or more programs for execution by the one or more processors, the method comprising:

receiving a media control command that requests a media control operation be implemented at a second electronic device distinct from the first electronic device; and in response to receiving the media control command:
sending a server media control request to a server system to cause the media control operation to be implemented at the second electronic device, wherein the server system is distinct from the first electronic device; and sending a local media control request to the second electronic device within a local network to which both the first electronic device and the second electronic device are connected, wherein the local media control request is a request to implement the media control operation at the second electronic device.

2. The method of claim 1, wherein the server media control request is sent to the server system over the Internet.

3. The method of claim 2, wherein the server system is associated with an IP address outside an IP address space of the local network.

4. The method of claim 1, wherein the local network is a Local Area Network.

5. The method of claim 1, wherein the first electronic device and the second electronic device are associated with IP addresses within the same subnetwork.

6. The method of claim 1, wherein the first electronic device provides a single user interface that allows a user both to select media content for presentation by the first electronic device and to generate media control requests configured to cause the media content to be presented by the second electronic device.

7. The method of claim 6, wherein the media content is selected from the group consisting of: an audio track; a video; an image; an audio playlist; and a video playlist.

8. The method of claim 6, wherein the media content is a video, the method further comprising presenting the video on a display associated with the second electronic device.

9. The method of claim 6, wherein the media content is an audio track, the method further comprising presenting the audio track on a speaker associated with the second electronic device.

10. The method of claim 1, wherein the first electronic device is selected from the group consisting of: a computer; a mobile phone; a remote control device; and a portable media player.

11. The method of claim 1, wherein the second electronic device is selected from the group consisting of: a television; a home media receiver; a computer; a home audio/visual system; and a speaker.

12. The method of claim 1, wherein the media control operation is selected from the group consisting of:
play;
pause;
skip;
fast-forward;
rewind;
adjust an audio volume;
change an order of items in a playlist;
add items to a playlist;
remove items from a playlist;
adjust audio equalizer settings; and
set a user setting.

13. A method for controlling media presentation, performed at a second electronic device having one or more processors and memory storing one or more programs for execution by the one or more processors, the method comprising:

receiving, from a server system, a server media control request corresponding to a media control operation to be implemented at the second electronic device, wherein the server media control request was sent from the server in response to the server receiving the server media control request from a first electronic device;

receiving, from the first electronic device, a local media control request sent within a local network to which both the first electronic device and the second electronic device are connected, wherein the local media control request corresponds to the media control operation;

performing the media control operation in response to a first-received request of the server media control request and the local media control request;

determining whether the server media control request and the local media control request are duplicates; and in accordance with determining that the server media control request and the local media control request are duplicates, ignoring a subsequently received request of the server media control request and the local media control request, wherein the subsequently received request is received after the first-received request.

14. The method of claim 13, wherein the server media control request is sent from the server system to the second electronic device over the Internet.

15. The method of claim 13, wherein the server system is associated with an IP address outside an IP address space of the local network.

16. The method of claim 13, wherein the local network is a Local Area Network.

17. The method of claim 13, wherein the first electronic device and the second electronic device are associated with IP addresses within the same subnetwork.

18. The method of claim 13, wherein performing the media control operation includes presenting media content at the second electronic device, and wherein the media content is being presented by the first electronic device, the method further comprising:

at the second electronic device:

prior to receiving the server media control request or the local media control request, buffering an upcoming portion of the media content being presented by the first electronic device;

receiving one of the server media control request or the local media control request; and initiating presentation of the buffered portion of the media content.

19. A method for controlling media presentation, performed at a second electronic device having one or more processors and memory storing one or more programs for execution by the one or more processors, the method comprising:

receiving, from a first electronic device, a local media control request corresponding to a media control operation of presenting a media stream at the second electronic device, wherein the local media control request is sent within a local network to which both the first electronic device and the second electronic device are connected;

receiving the media stream and a server media control request from a server system, wherein the media stream was sent from the server in response to the server receiving the server media control request from the first electronic device, and wherein the server media control request corresponds to the media control operation; and performing the media control operation of presenting the media stream in accordance with the server media control request and ignoring the local media control request.

20. The method of claim 19, wherein:

the media stream is received prior to receiving the local media control request, and ignoring the local media control request is performed in response to a determination that the local media control request corresponds to a request to initiate presentation of the media stream.

21. The method of claim 19, wherein the media stream includes a first timestamp, and the local media control request includes a second timestamp, and wherein determining that the local media control request corresponds to a request to initiate presentation of the media stream includes comparing the first and the second timestamps.

* * * * *